United States Patent Office 2,856,527
Patented Oct. 14, 1958

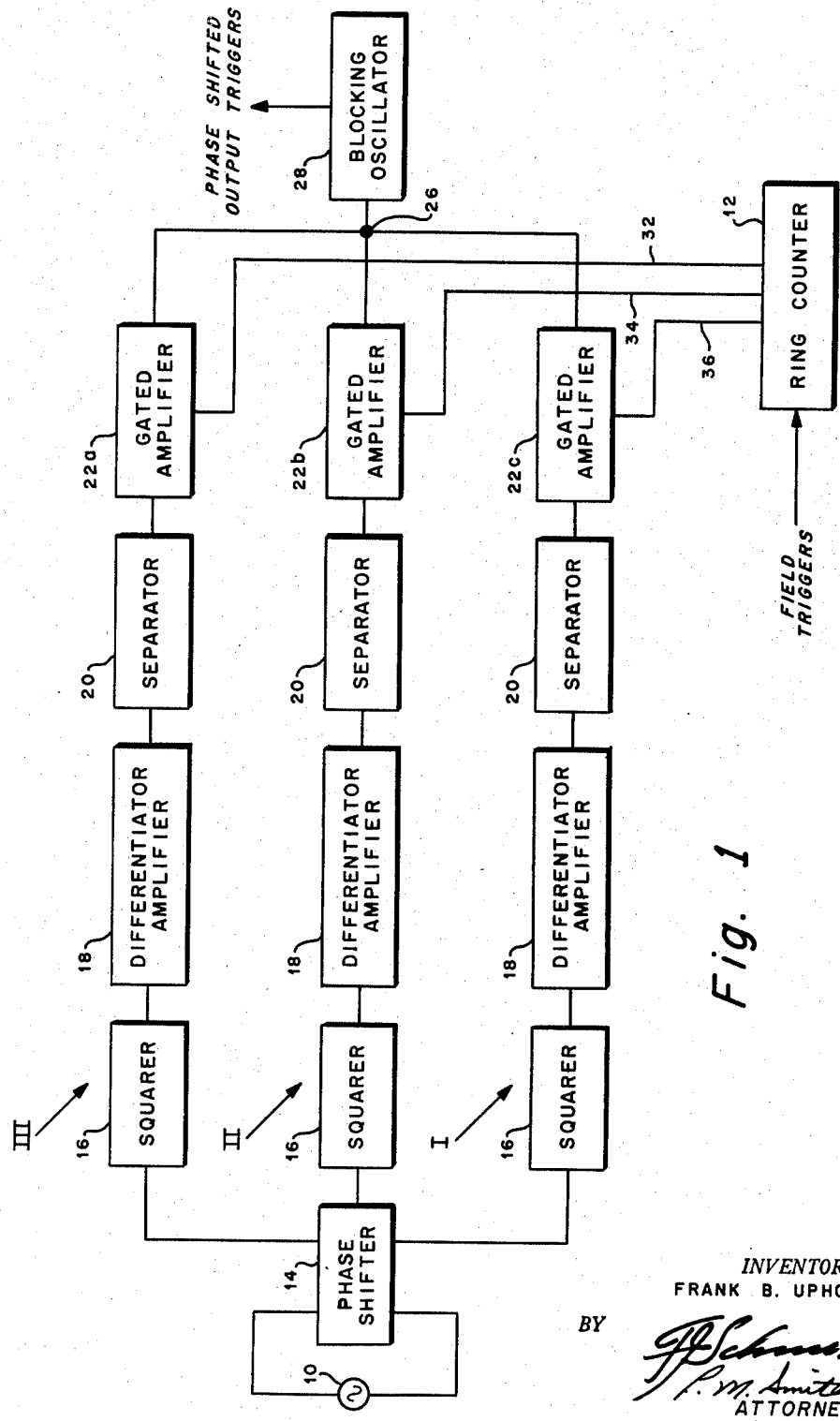

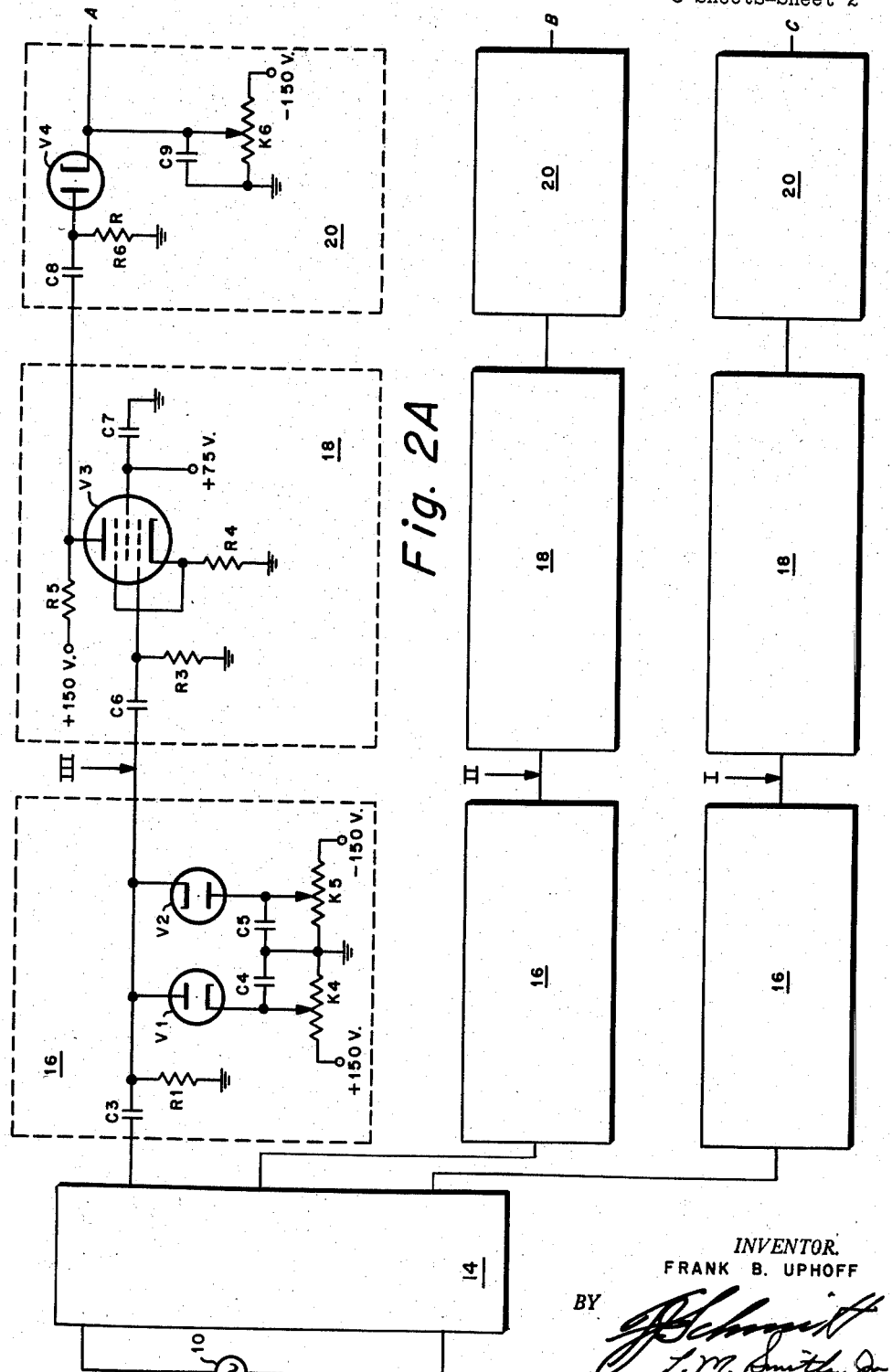

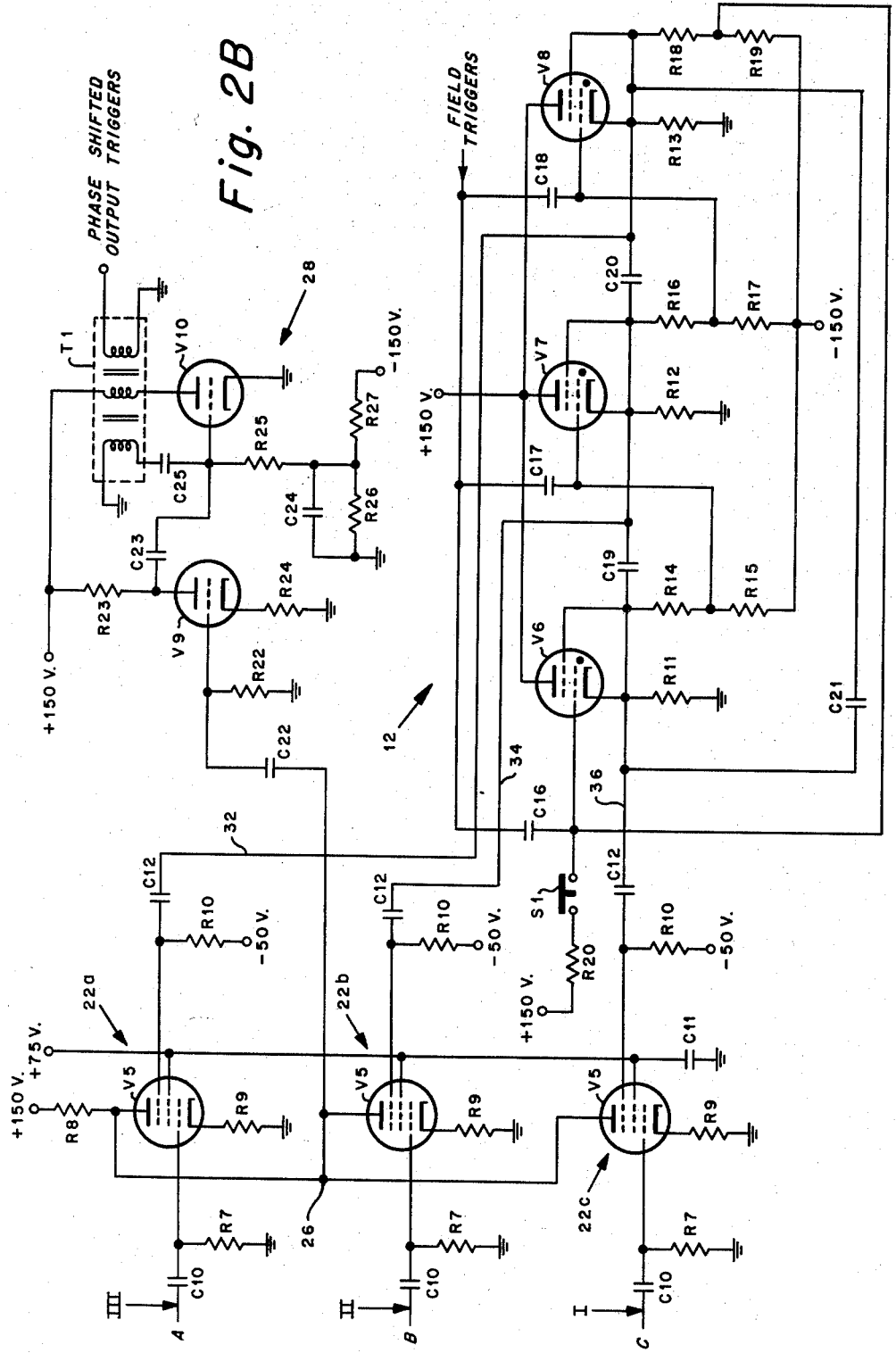

2,856,527

SYNCHRONIZED SYSTEM FOR THREE FIELD INTERLACED SCANNING

Frank B. Uphoff, Churchville, Pa.

Application November 21, 1956, Serial No. 623,718

10 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

The present invention relates to a synchronized system of interlaced scanning and more particularly to a self-synchronized system of interlaced scanning wherein a three field interlaced pattern is achieved.

Previous methods for obtaining interlace in visual indicators relied on equipment designed to maintain a fixed relationship between an antenna scan rate and a pulse repetition rate. One disadvantage of the former method was that it required absolute accuracy for the field frequency and the pulse repetition frequency in order to accomplish perfect interlace of the alternate fields. The failure to accomplish absolute accuracy in either the field frequency or the pulse repetition frequency not only caused imperfect interlace but also caused succeeding fields to drift on B scan indicator devices, or rotate on plan position indicator devices. Percentage variations in either of these frequencies caused a non-stationary, non-interlace indicator presentation.

The present invention overcomes the disadvantages of the aforementioned previous method by providing a self-synchronized system which will inherently provide absolute accuracy in the interlace pattern independent of the frequency stability of the generating means for both the repetition rate generator and the field frequency generator. The invention provides for the interlace of three or more fields as distinguished from the interlace of two fields as covered in applicant's application Serial No. 424,533, filed April 20, 1954, for Synchronized System of Interlaced Scanning. This invention uses oscillator or other signal generator producing a sine wave signal at a frequency which determines the number of lines per field to be generated. The output of the generator is divided into three channels which are shifted apart in phase from each other by 120°. The sine wave signals in all three of the channels are converted through the necessary circuitry to three series of appropriate pulses on the grids of three gated amplifiers, respectively. A second input to the system is in the nature of field triggers at the field frequency taken from a pick-off device mounted on the antenna shaft in radar applications or by means of a counter or frequency divider synchronized with the signal generator to give a fractional frequency of the generator frequency for radar or television applications indicating the beginning of each new field. The field frequency triggers are fed into a ring counter circuit which acts to ungate the three aforementioned gated amplifiers sequentially, so as to permit the output of the whole system to be a series of pulses which at the beginning of each cycle shifts 120° in phase. By this arrangement, it is apparent that at the common output of the system there will appear a series of pulses followed by a time interval in turn followed by a second series of pulses from a sequentially gated amplifier that is in turn followed by a different time interval than the time interval between the first and the second series of pulses, and a third series of pulses followed by a time interval different from the time interval between the first and second, and the second and third series of pulses, respectively. Each separate series of pulses is shifted by 120°, with the fourth series returning to the same phase position as the first series, and the fifth series returning to the same phase position as the second series, etc. Hence, in this manner the indicator is interlaced with a three field system.

An object of the present invention is the provision of a self-synchronized system of interlace scanning wherein a three or more field interlace indicator pattern is achieved.

A further object of the invention is the provision of apparatus for providing a self-synchronized system which will inherently provide absolute accuracy in the interlaced pattern presented on an indicator system wherein the accuracy of the interlace is independent of the frequency stability of the generation means repetition rate generator and the field frequency generator.

Still another object of this invention is apparatus for producing the interlace of three fields utilizing a repetition rate generator delivering its output in three parts and phased 120° apart through three channels respectively, and gating the output of said channels cyclically at the rate that scanning takes place so as to deliver a single output of the whole system which shifts in phase 120° at the beginning of each scanning cycle.

Another object of the present invention is the provision of apparatus for selectively and sequentially blocking in a plurality of channels all the channels but one so as to deliver a single output which at each instance represents the output of one of said plurality of channels.

Another object of the present invention is the provision of a self-synchronized system of interlace scanning involving the use of a plurality of channels delivering output triggers, each differing in phase from all of the adjoining channels, apparatus for selectively passing the output from only one of said channels at a time, and apparatus for receiving said selected triggers and converting said triggers into a plurality of rectangular trigger pulses having a fast rise and fall time capable of triggering the sweep in an indicator system.

Other objects and features of the invention will become apparent to those skilled in the art as the disclosure is made in the following detailed description of a preferred embodiment of the invention as illustrated in the accompanying drawings, in which:

Fig. 1 shows a block diagram of one form of the inventive self-synchronized system of interlace scanning.

Figs. 2A and 2B show the detailed circuitry making up the system shown in Fig. 1.

Referring now to the drawings wherein like reference characters designate like or corresponding parts throughout the several views, there is shown in Fig. 1 a block diagram for a three field interlace indicator. A generator 10 produces a sine wave signal at a frequency determining the number of lines per field. A ring counter 12 receives the field triggers which determine the number of sweeps per field. Generator 10 may be an alternator such as the A. C. tachometer mechanically linked to the shaft of a rotating radar antenna to generate an A. C. signal, while ring counter 12 would receive its signal from a generator driven by the same antenna, as shown in the aforementioned patent application.

Generator 10 delivers its output into a phase shifting device 14 which modifies the sine wave output signal of generator 10 into three sine wave signals each of which is separated by 120° in phase from all of the other said signals. The three outputs of phase shifting device 14 are passed into channels I, II and III, respectively, each one of which is identical in construction.

A squaring circuit 16 converts the sine wave input shown diagrammatically into a square wave output which is fed into differentiator-amplifier circuit 18. The latter converts the square wave input into positive and negative trigger pulses, which pulses are fed into separator 20 wherein the negative triggers are eliminated. The output of separator 20 consisting of a series of positive pulses is passed into the input of the respective gated amplifiers 22a, 22b, or 22c. Hence, it is understood that each of the channels produces a series of amplified pulses, the selected series of which is fed through a common point 26 into blocking oscillator 28 which converts the pulses into square shaped trigger pulses having a fast rise and fall time.

Ring counter circuit 12 selectively and sequentially unblocks only one of the gated amplifiers 22a, 22b, 22c at a time insuring that only pulses from one channel at a time are passed through common point 26 to the input of blocking oscillator 28. For this purpose, there is delivered to ring counter 12, as already noted, a series of field frequency triggers at a frequency that may be the frequency of rotation of the antenna shaft in radar applications or a frequency which may be determined by means of a counter or frequency divider synchronized with generator 10 to give a fractional frequency for radar or television applications. The field frequency triggers serve to operate ring counter 12 in a manner to be described below so that the pulses are passed through lines 32, 34 and 36 selectively and sequentially to ungate each of said amplifiers 22a, 22b and 22c, in proper turn. The frequency of the field triggers is far lower usually, than the frequency of the triggered pulses passing through channels I, II and III. When one field trigger passes through ring counter 12, for example, a signal may be passed through line 32 which serves to ungate amplifier 22a. Amplifier 22a will remain ungated, and will pass its input trigger pulses through point 26 to the input of blocking oscillator 28 until the next field trigger enters counter 12 and ungates amplifier 22b, and at the same time blocks amplifier 22a by reducing the voltage on line 32. After a second finite interval of time representing one cycle of the field frequency, another field trigger passes into ring counter 12 causing a signal through line 36 to ungate amplifier 22c to unblock the latter amplifier and pass the signal from the latter through point 26 to the input of blocking oscillator 28. In this way, blocking oscillator 28 receives a series of pulses from each of said gated amplifiers sequentially, each for an identical period of time representing one cycle of field frequency. Since the triggers from each of said channels I, II and III are phased 120° from each other, blocking oscillator 28 will pass triggers shifted 120° in phase at the beginning of each scanning cycle. When blocking oscillator 28 receives the fourth series of signals, from gated amplifier 22a in this example, then the phase of the triggers delivered by blocking oscillator 28 will return to the first or original position when gated amplifier 22a was previously delivering its output and the pattern on the indicator will return to the initial position.

Figs. 2A and 2B show a schematic representation of the apparatus for carrying out the functions of the system shown in Fig. 1. Generator 10 delivers its sine wave output as hereinbefore stated of appropriate frequency to phase shifter 14, which may be of any type, embracing resistive-capacitive elements, or the like, in order to effect a three phase sinusoidal output signal, the phases being symmetrically disposed 120° apart. The respective signals are supplied to the respective input circuits of the pulse shaping channels, designated generally by Roman numeral notation, as indicated throughout the several views. Each of the three channels, as seen in Figs. 2A and 2B may be identical.

One phase of the three-phase signal supplied from phase shifter 14 is fed into the squaring circuit 16 through the coupling pair condenser $C_3$ and resistor $R_1$. The squaring circuit 16 consists of a pair of diodes $V_1$ and $V_2$ oppositely connected in a manner to be described. The plate of diode $V_1$ is connected to receive the input to the circuit from capacitor $C_3$ while the cathode of $V_1$ is connected to a wiper arm on potentiometer $K_4$ which is connected at one end to a source of positive 150 volts. The cathode of diode $V_2$ is connected to the plate of diode $V_1$ while the plate of the former is connected to the wiper arm of a potentiometer $K_5$, which is connected at one end to a source of $-150$ volts. The opposite terminals of potentiometers $K_4$ and $K_5$ are connected through a common lead to ground. A pair of capacitors $C_4$ and $C_5$ join the cathode and plate of diodes $V_1$ and $V_2$, respectively, to ground. The wiper arms of potentiometers $K_4$ and $K_5$ develop the bias voltages which determine the clipping levels of the squaring circuit 16. Condensers $C_4$ and $C_5$ are by-pass capacitors whose purpose is to keep the wiper arms of potentiometers $K_4$ and $K_5$ at A. C. ground potential. The approximate square wave voltage output taken from the plate of diode $V_1$ and cathode of $V_2$ is RC coupled to the grid of vacuum tube pentode $V_3$ of differentiator-amplifier 18 by capacitor $C_6$ and resistor $R_3$. Capacitor $C_6$ and resistor $R_3$ are so proportioned that they differentiate the approximate square wave output of diodes $V_1$ and $V_2$ so as to produce a series of positive and negative pulses at the input of vacuum tube $V_3$. The plate of vacuum tube $V_3$ is connected through resistor $R_5$ to a source of positive 150 volts. The cathode of vacuum tube $V_3$ is connected to ground through the resistor $R_4$. The screen grid is connected to a positive 75 volt source, which is also provided with an A. C. by-pass capacitor $C_7$ to ground. The suppressor grid of vacuum tube $V_3$ is joined to the cathode. This forms the circuit of a conventional resistance coupled pentode amplifier. The function of the differentiator-amplifier circuit 18 is to increase the voltage level of the positive and negative pulses at the input tube. The output pulse signal from the plate of vacuum tube $V_3$ is coupled to the plate of diode $V_4$ of separator circuit 20 by RC coupling comprised of capacitor $C_8$ and resistor $R_6$. The cathode of diode $V_4$ is connected to the wiper arm of a potentiometer $K_6$ which is connected between ground and a source of $-150$ volts. By-pass capacitor $C_9$ is connected from the wiper arm of potentiometer $K_6$ to ground to place the later at A. C. ground. Potentiometer $K_6$ is used to adjust the bias on the cathode of diode $V_4$, thus affording a means of adjusting the clipping level of this tube. Potentiometer $K_6$ is adjusted so that only the positive pulses of the input signal appear in the output of this tube, performing the function of the separator circuit. The output signal voltage from vacuum tube $V_4$ is coupled through line A to the grid of vacuum tube $V_5$ of gated amplifier 22a by RC coupling consisting of capacitor $C_{10}$ and resistor $R_7$, as seen in Fig. 2B.

Each of the gated amplifiers 22a, 22b and 22c consists of a pentode vacuum tube $V_5$ having its plate connected through resistor $R_8$ to a source of positive 150 volts. The cathode of each vacuum tube $V_5$ is connected to ground through a resistor $R_9$. The screen grids are connected directly to a source of positive 75 volts and to ground through a capacitor $C_{11}$ for by-passing the A. C. The suppressor grids of vacuum tubes $V_5$ are connected both to a source of $-50$ volts through resistors $R_{10}$ and through coupling capacitors $C_{12}$ each to one of the three outputs of ring counter 12, through lines 32, 34, and 36, respectively. In the absence of a gating signal on the suppressor grid of a vacuum tube $V_5$, the latter is cut off due to the bias applied from the source of $-50$ volts applied through resistor $R_{10}$, as is understood in the art.

Ring counter circuit 12 consists of three pentode thyratron tubes $V_6$, $V_7$ and $V_8$. The field trigger pulses whose frequency is equal to the frequency of the interlaced field is applied simultaneously to the grids of all the thyratrons $V_6$, $V_7$ and $V_8$ through coupling capacitors $C_{16}$, $C_{17}$ and $C_{18}$, respectively. The plates of all the thyratrons are connected to a positive source of 150 volts. The cathodes of thyratron $V_{16}$, $V_{17}$ and $V_{18}$ are connected through ground through resistors $R_{11}$, $R_{12}$, and $R_{13}$, respectively. The cathode of thyratron $V_6$ is also connected through resistors $R_{14}$ and $R_{15}$ to a source of $-150$ volts. The cathodes $V_7$ and $V_8$ are similarly wired through resistors $R_{16}$, $R_{17}$ and $R_{18}$, $R_{19}$. The control grid of thyratron $V_6$ is connected through a switch S1 and a resistor $R_{20}$ to a source of positive 150 volts. The cathode of $V_6$ is also connected through a coupling capacitor $C_{19}$ to the cathode of the next thyratron $V_7$, and capacitor $C_{20}$ provides the same coupling between $V_7$ and $V_8$, and $C_{21}$ between $V_8$ and $V_6$. The point connecting resistors $R_{14}$ and $R_{15}$ is tied to the control grid of the next thyratron stage $V_7$, while the other thyratron stages are connected in a similar fashion, with $R_{18}$ and $R_{19}$ connected back to the grid of $V_6$, thus completing the ring arrangement.

Operation of ring counter circuit 12 to select a channel for delivering a signal to trigger amplifier 28 is begun by the momentary depression of the starter button S1 to apply a positive firing voltage of 150 volts to the grid of tube $V_6$ to temporarily remove the bias on that tube. If desired, relay vacuum tube, or transistor means could be incorporated to accomplish that function. The normal grid bias on tube $V_6$ before the switch S1 is depressed is the $-150$ volts which is connected through resistor $R_{19}$ to the grid. The positive 150 volts applied through resistor $R_{20}$ and switch S1 at the time the latter is depressed overcomes this negative bias and initiates conduction of the tube. Conduction will continue after release of switch S1 because the gas in $V_6$ is ionized and the negative bias of $-150$ volts is insufficient to cause deionization, as is understood in the art. In this way, it is seen that in the beginning of ring counter 12 operation, tube $V_6$ is conducting while tubes $V_7$ and $V_8$ are not conducting. Due to the heavy current conduction through $V_6$, a voltage drop across resistor $R_{11}$ will cause a decrease in negative bias on the grid of $V_7$ through the effect of the grid bias voltage divider composed of $R_{11}$, $R_{14}$ and $R_{15}$. This decrease in grid bias on tube $V_7$ causes the latter tube to be primed sufficiently so that a positive trigger pulse applied to the grid of $V_7$ will cause the latter to go into conduction. While $V_6$ is conducting, the voltage level of its cathode will be high enough to overcome the $-50$ volt bias on the suppressor grid of tube $V_5$ in gated amplifier 22C in channel I of the circuit. Hence vacuum tube $V_5$ of amplifier 22C will conduct and deliver its output to the input of trigger amplifier 28. When the next positive trigger pulse appears on the input terminal of ring counter 12, it will be applied, of course, equally to all of the thyratrons $V_6$, $V_7$ and $V_8$ through their respective capacitors $C_{16}$, $C_{17}$ and $C_{18}$ to the respective grids. Since only tube $V_7$ is primed for going into conduction upon this momentary increase in voltage, the positive trigger pulse will cause it to fire and go into heavy conduction. Heavy conduction of thyratron $V_7$ will cause a positive voltage to appear across its cathode resistor $R_{12}$. An increase in voltage at the cathode of $V_7$ will result in an increase in voltage at the cathode of $V_6$. In view of the negative bias of the grid of $V_6$, the potential differences between plate, grid and cathode will decrease sufficiently to extinguish the tube, as is understood in the art. In addition, a further effect of the heavy conduction through cathode resistor $R_{14}$ of thyratron $V_7$ is a decrease in bias on the grid of $V_8$ through the effect of the voltage divider consisting of $R_{12}$, $R_{16}$, and $R_{17}$, as explained in connection with $V_6$. Hence, tube $V_8$ then becomes in a primed condition. While thyratron $V_7$ is conducting, channel II will be opened and vacuum tube $V_5$ of amplifier 22b will conduct to deliver its signal to blocking oscillator 28. When thyratron $V_6$ went out of conduction as $V_7$ went into conduction, channel I became suppressed due to the fact that tube $V_5$ of amplifier 22c became non-conducting, as a result of the decrease in the voltage on line 36 cancelling out the $-50$ volt bias on the suppressor grid of tube $V_5$. Similarly, the next positive field trigger pulse will cause thyratron $V_7$ to be extinguished and thyratron $V_8$ to go into heavy conduction. In this manner, ring counter 12 functions to select sequentially and consecutively the gated amplifier to function, thereby passing only one of the three channels at a time into trigger amplifier 28.

The output signal from the common load resistor of the gated amplifiers 22a, 22b and 22c is RC coupled into trigger amplifier tube $V_9$ of blocking oscillator 28, by capacitor $C_{22}$ and resistor $R_{22}$. The plate of $V_9$ is connected to positive 150 volts through resistor $R_{23}$. The cathode of $V_9$ is connected to ground through resistor $R_{24}$. $V_9$ amplifies and inverts the triggers at its grid, as is understood in the art. The output of $V_9$ is coupled into the grid of blocking oscillator tube $V_{10}$ by capacitor $C_{23}$. The grid of vacuum tube $V_{10}$ is connected to one end of resistor $R_{25}$, the other end of which is connected to the junction of resistors $R_{26}$ and $R_{27}$ which form a grid bias voltage divider network. The other end of $R_{27}$ is connected to $-150$ volts, while the opposite end of $R_{26}$ is connected to ground. By-pass capacitor $C_{24}$ is connected across the terminals of $R_{26}$. The grid of vacuum tube $V_{10}$ is connected to a secondary winding of a pulse transformer T1 by capacitor $C_{25}$. The other end of this secondary winding is connected to ground. The plate of vacuum tube $V_{10}$ is connected to a source of $+150$ volts through the primary winding of pulse transformer T1. The cathode of vacuum tube $V_{10}$ is connected to ground. A third or tertiary winding of transformer T1 is connected to ground on one side and to the output terminal of the whole system on the other side.

Blocking oscillator tube $V_{10}$ normally operates at cut-off bias which is supplied through the bias voltage divider network consisting of $R_{26}$ and $R_{27}$, and through grid bias resistor $R_{25}$. A positive pulse from trigger amplifier tube $V_9$ at the grid of blocking oscillator tube $V_{10}$ overcomes the cut-off bias and puts the latter tube into conduction. As plate current flows through the primary winding of blocking oscillator transformer T1, it induces a voltage into the secondary winding of this transformer. This induced voltage is fed back to the grid and is of such phase that it tends to further increase the plate current in vacuum tube $V_{10}$, thus causing a regenerative increase in the plate current of this tube. As this regenerative increase in plate current and grid voltage continues the tube operates on an increasingly higher mutual conductance characteristic. This gives rise to a very sharp pulse of current in the primary of transformer T1. The voltage rise at the grid of blocking oscillator tube $V_{10}$ continues until the grid is driven positive with respect to the cathode. At this point, grid current begins to flow and the grid to cathode impedance of tube $V_{10}$ becomes very low impedance. This low impedance in the secondary of T1 presents a heavy load to the primary of pulse transformer T1. The power dissipated in the grid circuit, the internal losses of the tube, and the load on the blocking oscillator transformer increases to a point where they can no longer be supplied by the plate circuit. The plate voltage of $V_{10}$ drops to a low value due to the heavy current through the primary winding of pulse transformer which causes a reduction in the mutual conductance of the tube.

The flow of grid current when the grid of the blocking oscillator tube $V_{10}$ is driven positive charges capacitor $C_{23}$ to a voltage which is the opposite in polarity to the feedback voltage being applied to the grid. Ultimately, the voltage across this capacitor $C_{25}$ increases to a point where the feed back voltage is insufficient to increase or maintain the voltage at the grid of the tube. These conditions acting together cause the regenerative increase in plate current of the tube to stop and an equilibrium condition is reached. During equilibrium, the plate current in vacuum tube $V_{10}$ is no longer changing and due to the stationary flux linking the secondary of T1 a feed back voltage in that secondary of T1 will no longer be induced. Equilibrium will be maintained while the magnetizing current discharges from the secondary winding of T1. In the absence of feed back voltage, the negative charge on capacitor $C_{25}$ will cause the grid to go negative with respect to the cathode. This causes a decrease in plate current which induces a voltage into the secondary winding in such a way as to cause the grid to go further negative. This cycle of events continues and causes a rapid degenerative turn-off of plate current in the blocking oscillator tube $V_{10}$. Cut-off bias is soon reached, thus finishing the generation of the rectangular pulse. Since the grid of $V_{10}$ is now negative, current will not flow through the tube but the charge on capacitor $C_{25}$ decays through resistor $R_{25}$. In a time equal to the time constant of $C_{25}$ and $R_{25}$ the negative charge on the grid will have decayed to the normal operating bias voltage of the tube. The tube is then ready to fire and produce another pulse upon the application of a positive trigger pulse.

The narrow, rectangular pulse generated by tube $V_{10}$ is coupled to the output winding of T1 where it can be delivered to the oscilliscope indicator. Hence, blocking oscillator 28 provides a low impedance source of rectangular trigger pulses that have a fast rise and fall time. The output signal from the blocking oscillator 28 and the whole system is a continuous series of rectangular pulses divided into three groups. Each group differs in phase from the preceding group by 120°. The length of time of each group of triggers is determined by the interval between the field triggers which also determine the period of one field and the number of sweeps per field for the oscilloscope presentation. The fourth group of pulses is identical in phase with the first group. The fifth and sixth groups of pulses are identical in phase with the second and third group of pulses, respectively. This sequence of pulses grouped according to phase continues to repeat itself during the operation of the system. Since the position of the sweep on the face of the oscilloscope indicator is determined by the timing of the trigger pulse which initiates it, the sweeps of two successive lines will be equally spaced between the lines of the preceding field. The lines of a fourth field of sweep will be positioned identically in the lines of the first field and the lines of the fifth and sixth fields will be positioned identically with the lines of the second and third fields. The resulting oscilloscope presentation is a perfectly interlaced pattern composed of three fields which are self-synchronized to the antenna rotational speed for the repetition rate generator.

It is thus seen that there has been provided a novel arrangement for producing the interlace of three fields and at the same time providing absolute accuracy in the interlaced pattern presented independently of the frequency stability of the repetition rate generator and the field frequency generator. It will be seen that the instant invention does not depend on the relationship between the generator frequency and the frequency of the field trigger source to obtain the desired interlaced scanning pattern. Further more, the system herein described is self-synchronized and also provides an indicator pattern which is perfectly stationary regardless of variations in repetition rate. Other apparent advantages are stability of the indicator pattern, a constant ratio of sweeps per field, and elimination of the necessity for accuracy of the repetition rate generator and the field frequency generator to produce a relatively simple electronic circuitry wherein whose accuracy requirements are greatly decreased and whose reliability and actual performance are greatly increased.

Of course, many modifications may be utilized without departing from the principles of this invention. As noted, the repetition rate generator may be an A. C. tachometer directly and mechanically coupled to a rotating shaft by a radar system antenna. In this case the field triggers would be taken from a pick-off device or transducer, mechanically or electrically coupled to the same rotating shaft. On the other hand, the repetition rate generator may comprise an electronic sine wave generator. For example, this might be of the vacuum tube or transistor oscillator type. The field triggers could be derived from the repetition rate generator by using electronic counting circuits to divide the frequency from the repetition rate to the field trigger rate. This would be particularly useful in television applications. Various other means in accordance with known electronic equivalents can be accomplished to perform individual circuit functions in the device without departing from the scope of the invention. It is understood that different types of stages may be freely substituted for the ones shown as long as the invention is carried out. Transistors and solid state diodes may be substituted for vacuum tubes or the vacuum tube rectifiers used.

Obviously many modifications and variations of the present invention are possible in the light of the above teachings. It is, therefore, to be understood that within the scope of the appended claims the invention may be practiced otherwise than as specifically described.

What is claimed is:

1. A synchronized system of interlaced scanning to achieve a three-field indicator pattern comprising means for generating a plurality of repetition rate frequency voltages each a sine signal separated in phase from each of the other signals by an equal difference in phase, the total of said differences equalling 360°, circuit means for each of said signals for converting said signals each into a series of positive triggers, gated amplifier means for each said signal for receiving its respective triggers, all of said gated amplifier means normally suppressed, a source of triggers at a frequency of said field substantially lower than the frequency of said repetition rate, and ring counter means for receiving said field triggers for sequentially unblocking in response to said field triggers each of said gated amplifier means one at a time, in an order selected so that each succeeding series of signal triggers passing therethrough advances in phase by an amount equal to said difference, thereby producing at the output of said system a series of trigger pulses at the repetition rate frequency which pulses advance in phase by said difference at the beginning of each sweep period of said field frequency.

2. The synchronized system of claim 1 in which each said circuit means includes a squarer circuit to convert said sine signals into square waves, differentiator means for converting said square waves into positive and negative trigger pulses, and separator means for blocking said negative trigger pulses.

3. A synchronized system of interlaced scanning to achieve a three-field indicator pattern comprising means for generating a plurality of repetition rate frequency signal each separated in phase from each of the other signals by an equal difference in phase, the total of said differences equalling 360°, circuit means for each of said signals for converting said signals each into a series of positive triggers, pentode gated amplifier means for each said signal for receiving its respective triggers, all of said gated amplifier means normally suppressed by the presence of bias on the suppressor grids thereof, a source of triggers at a frequency of said field substantially lower than the frequency of said repetition rate, and ring counter means for receiving said field triggers for sequentially unblocking in response to said field triggers each of said gated amplifier means one at a time by the removal of said bias in an order selected so that each succeeding series of signal triggers passing therethrough advances in phase by an amount equal to said difference, thereby producing as the output of said system a series of trigger pulses at the repetition rate frequency which pulses advance in phase by said difference at the beginning of each sweep period of said field frequency.

4. A synchronized system of interlaced scanning to achieve a three-field indicator pattern comprising means for generating a plurality of repetition rate frequency signals each separated in phase from each of the other signals by an equal difference in phase, the total of said differences equalling 360°, circuit means for each of said signals for converting said signals each into a series of positive triggers, pentode gated amplifier means for each said signal for receiving its respective triggers, all of said gated amplifier means normally suppressed by the presence of bias on the suppressor grids thereof, a source of triggers at a frequency of said field substantially lower than the frequency of said repetition rate, and ring counter means for receiving said field triggers for sequentially unblocking in response to said field triggers each of said gated amplifier means one at a time by the removal of said bias in an order selected so that each succeeding series of signal triggers passing therethrough advances in phase by an amount equal to said difference, said ring counter means including a grid-controlled thyratron for each of said amplifier means, the conduction of a particular thyratron brought about by a field trigger causing the unblocking of the latter amplifier means, thereby producing as the output of said system a series of trigger pulses at the repetition rate frequency which pulses advance in phase by said difference at the beginning of each sweep at the period of said field frequency.

5. A synchronized system of interlaced scanning to achieve a three field interlaced indicator pattern comprising means for generating a repetition rate frequency signal, phase shifting network means for converting said repetition rate signal into a plurality of sine signals each separated in phase from each of the other signals by an equal difference in phase, the total of said differences equalling 360°, circuit means for each of said signals for converting said signals each into a series of positive triggers, gated amplifier means for each of said signals for receiving its respective triggers, all of said gated amplifier means normally suppressed, a source of triggers synchronized at the field scanning frequency having a constant relationship with said repetition rate frequency and being substantially lower than said repetition rate frequency, ring counter means for receiving said field triggers for sequentially unblocking one at a time each of said gated amplifier means in an order selected such that each succeeding series of signal triggers passing therethrough changes in phase in the same direction by an amount equal to said difference, and blocking oscillator means for receiving the output triggers of said gated amplifier means and converting said output triggers into narrow, rectangular pulses of fast rise and fall time suitable for triggering the sweeping signals of said indicator means, said system thereby producing as its output a series of rectangular trigger pulses at the repetition rate frequency which pulses shift in phase in the same direction by said difference at the beginning of each sweep period of said field frequency.

6. A synchronized system of interlaced scanning to achieve a three field interlaced indicator pattern comprising means for generating a repetition rate frequency signal, phase shifting network means for converting said repetition rate signal into a plurality of sine signals each separated in phase from each of the other signals by an equal difference in phase, the total of said differences equalling 360°, circuit means for each of said signals for converting said signals each into a series of positive triggers, gated amplifier means for each of said signals for receiving its respective triggers, all of said gated amplifier means normally supressed, a source of triggers synchronized at the field scanning frequency having a constant relationship with said repetition rate frequency and being substantially lower than said repetition rate frequency, ring counter means for receiving said field triggers for sequentially unblocking one at a time each of said gate amplifier means in an order selected such that each succeeding series of signal triggers passing therethrough changes in phase by an amount equal to said difference, said ring counter means including a grid-controlled thyratron for each of said amplifier means, the conduction of a particular thyratron brought about by a field trigger causing the unblocking of the latter amplifier means, and blocking oscillator means for receiving the output triggers of said gated amplifier means and converting said output triggers into narrow, rectangular pulses of fast rise and fall time suitable for triggering the sweeping signals of said indicator means, said system thereby producing as its output a series of rectangular trigger pulses at the repetition rate frequency which pulses shift in phase by said difference at the beginning of each sweep period of said field frequency.

7. A synchronized system of interlaced scanning to achieve a three field interlaced indicator pattern comprising means for generating a repetition rate frequency signal, phase shifting network means for converting said repetition rate signal into three sine signals each separated in phase from each of the other signals by 120°, circuit means for each of said signals for converting said signals each into a series of positive triggers, gated amplifier means for each of said signals for receiving its respective triggers, all of said gated amplifier means normally suppressed, a source of triggers synchronized at the field scanning frequency having a constant relationship with said repetition rate frequency and being substantially lower than said repetition rate frequency, ring counter means for receiving said field triggers for sequentially unblocking one at a time only each of said gated amplifier means in an order selected such that each succeeding series of signal triggers passing therethrough changes in phase by an amount equal to said difference, and blocking oscillator means for receiving the output triggers of said gated amplifier means and converting said output triggers into narrow, rectangular pulses of fast rise and fall time suitable for triggering the sweeping signals of said idicator means, said system thereby producing as its output a series of rectangular trigger pulses at the repetition rate frequency which pulses shift in phase by said difference at the beginning of each sweep period of said field frequency.

8. A synchronized system of scanning to achieve at least a three field interlaced pattern comprising means for generating a repetition rate frequency signal, phase shifting network means for converting said repetition rate signal into a plurality of successive signals each separated in phase from its preceding signal by an equal difference, circuit means for each of said successive signals for converting each of the latter into a series of positive triggers, gated amplifier means for each said trigger series for receiving the latter, all of said gated amplifier means having a suppressor grid normally biased to prevent conduction therethrough, a source of triggers at the field frequency, and ring counter means for receiving said field triggers for sequentially unblocking one at a time only each of said gated amplifier means so that each succeeding series of triggers passed by a gated amplifier means shifts in phase by an amount equal to said difference, said ring counter means comprising a grid-controlled thyratron for, and delivering its output when conducting to, each of said gated amplifier means for cancelling said bias and causing conduction therethrough, means normally biasing said thyratrons to prevent ionization and conduction therethrough, and circuit means for utilizing each field trigger for ionizing and causing conduction of one of said thyratrons, causing deionization of the preceding thyratron, and priming the succeeding thyratron for making the latter responsive to the next succeeding field trigger for ionization, thereby producing as the output of said system a series of trigger pulses at the repetition rate frequency which pulses change in phase by said difference at the beginning of each sweep period of said field frequency.

9. A synchronized system of scanning to achieve at least a three field interlaced indicator pattern comprising means for generating a plurality of repetition rate frequency signals each separated in phase from its preceding signal by an equal difference, the total of said differences equalling 360°, circuit means for each of said signals for converting each of the latter into a series of positive triggers, gated amplifier means normally nonconductive for each said series of triggers to receive the latter, means for supplying pulses synchronized at the field frequency having a constant relationship with said repetition rate frequency and substantially lower than said repetition rate frequency, means responsive to said pulses for sequentially unblocking to render conductive one at a time the gated amplifier means for each successive series of triggers, and means combining the outputs of all said gated amplifier means to produce as the output of said system a combined series of triggers at the repetition rate frequency which series changes in phase by said difference at the beginning of each sweep period of said field frequency.

10. A synchronized system of scanning to achieve at least a three field interlaced indicator pattern comprising means for generating a repetition rate frequency, phase shifting network means for converting said repetition rate frequency into a plurality of successive signals each separated in phase from its preceding signal by an equal difference, the total of said differences equalling 360°, circuit means for each of said signals for converting each of the latter into a series of positive triggers, gated amplifier means having a suppressor grid normally biased to prevent conduction therethrough for each said series of triggers to receive the latter, means for supplying pulses synchronized at the field frequency having a constant relationship with said repetition rate frequency and substantially lower than said repetition rate frequency, grid-controlled thyratron means responsive to said pulses for sequentially unblocking one at a time the gated amplifier means for successive series of triggers, and means combining the outputs of all said gated amplifier means to produce as the output of said system a combined series of triggers at the repetition rate frequency which changes in phase by said difference at the beginning of each sweep period of said field frequency.

References Cited in the file of this patent

UNITED STATES PATENTS

| | | |
|---|---|---|
| 2,195,853 | Fitch | Apr. 2, 1940 |
| 2,690,510 | Forbes | Sept. 28, 1954 |
| 2,786,100 | Earp | Mar. 19, 1957 |
| 2,787,707 | Cockburn | Apr. 2, 1957 |